US010588322B2

(12) United States Patent
Hamon et al.

(10) Patent No.: US 10,588,322 B2
(45) Date of Patent: Mar. 17, 2020

(54) SYSTEM FOR PRESERVING AND METERING INGREDIENTS, AND PRESERVING AND METERING METHOD IMPLEMENTING SUCH A SYSTEM

(71) Applicant: EKIM, Montevrain (FR)

(72) Inventors: Cyrill Hamon, Montevrain (FR); Sébastien Roverso, Bussy-Saint-Georges (FR); Faustine Calvarin, Emerainville (FR)

(73) Assignee: EKIM, Montevrain (FR)

( * ) Notice: Subject to any disclaimer, the term of this patent is extended or adjusted under 35 U.S.C. 154(b) by 0 days.

(21) Appl. No.: 16/074,413

(22) PCT Filed: Feb. 2, 2017

(86) PCT No.: PCT/EP2017/052233
§ 371 (c)(1),
(2) Date: Dec. 17, 2018

(87) PCT Pub. No.: WO2017/134153
PCT Pub. Date: Aug. 10, 2017

(65) Prior Publication Data
US 2019/0124933 A1    May 2, 2019

(30) Foreign Application Priority Data
Feb. 3, 2016   (FR) ..................... 16 50852

(51) Int. Cl.
*A21C 9/04*       (2006.01)
*A21D 13/41*     (2017.01)

(52) U.S. Cl.
CPC ............... *A21C 9/04* (2013.01); *A21D 13/41* (2017.01)

(58) Field of Classification Search
None
See application file for complete search history.

(56) References Cited

U.S. PATENT DOCUMENTS 3,633,450 A  *  1/1972  Grote ..................... A21C 9/04
                                                                      99/450.1
3,660,118 A  *  5/1972  Raimondi ............ A23G 3/2007
                                                                      118/16

(Continued)

FOREIGN PATENT DOCUMENTS

AU            763526 B2      7/2001

OTHER PUBLICATIONS

French Search Report from French Patent Application No. 1650852, dated Oct. 17, 2016.

(Continued)

*Primary Examiner* — Ibrahime A Abraham
*Assistant Examiner* — Gyounghyun Bae
(74) *Attorney, Agent, or Firm* — Greer, Burns & Crain, Ltd.

(57) ABSTRACT

A system for preserving and metering ingredients, including a set of compartments arranged in a preservation chamber and a device for removing and metering ingredients for removing a predetermined quantity of ingredients from at least one compartment, the removing device including (i) a collecting vessel intended to temporarily store, in successive layers, the ingredients withdrawn from each compartment, (ii) a controlled conveying mechanism intended to move the collecting vessel into the vicinity of each compartment, and (iii) a control unit. A distribution device is intended to dispose the removed ingredients randomly and homogeneously on the surface of a substrate.

13 Claims, 5 Drawing Sheets

(56) References Cited

U.S. PATENT DOCUMENTS

| | | | | |
|---|---|---|---|---|
| 3,735,692 A | * | 5/1973 | Marchignoni | A21B 5/02 99/353 |
| 3,861,294 A | * | 1/1975 | Coldren | B02B 1/08 99/516 |
| 3,908,584 A | * | 9/1975 | Raque | A21C 9/04 118/682 |
| 4,152,976 A | | 5/1979 | Kawasaki et al. | |
| 4,202,260 A | | 5/1980 | Weger | |
| 4,632,257 A | * | 12/1986 | Negishi | G07F 11/34 193/2 R |
| 4,887,619 A | * | 12/1989 | Burcham, Jr. | A24B 3/04 131/305 |
| 5,033,366 A | * | 7/1991 | Sullivan | A21B 7/00 99/352 |
| 5,121,677 A | * | 6/1992 | Le Claire | A21C 9/04 118/18 |
| 5,243,899 A | * | 9/1993 | Moshier | A21C 9/04 99/443 C |
| 5,458,055 A | * | 10/1995 | Fitch, Jr. | A21C 9/04 83/703 |
| 5,522,310 A | * | 6/1996 | Black, Sr. | A47J 27/14 221/113 |
| 5,685,460 A | * | 11/1997 | Vlastuin | A47F 1/03 222/154 |
| 5,921,170 A | * | 7/1999 | Khatchadourian | A21C 9/04 99/349 |
| 6,546,847 B2 | * | 4/2003 | Pilati | A21C 9/04 99/348 |
| 7,703,639 B2 | * | 4/2010 | Landau | A47G 19/34 222/1 |
| 8,276,505 B2 | * | 10/2012 | Buehler | A23L 5/10 99/326 |
| 8,708,199 B2 | * | 4/2014 | James | G07F 9/105 222/158 |
| 9,123,196 B1 | * | 9/2015 | Salem | G07F 11/26 |
| 2002/0022071 A1 | | 2/2002 | Hansen | |
| 2003/0183164 A1 | | 10/2003 | Pierre | |
| 2004/0238555 A1 | | 12/2004 | Parks | |
| 2005/0178277 A1 | | 8/2005 | Simonsen | |
| 2011/0209661 A1 | * | 9/2011 | Fritz-Jung | B25J 11/00 118/696 |
| 2012/0185086 A1 | * | 7/2012 | Khatchadourian | A21D 8/02 700/233 |

OTHER PUBLICATIONS

International Search Report from International Patent Application No. PCT/EP2017/052233, dated May 3, 2017.

International Preliminary Report on Patentability (under Chapter II) from International Patent Application No. PCT/EP2017/052233, dated Jun. 7, 2018.

* cited by examiner

SYSTEM FOR PRESERVING AND METERING INGREDIENTS, AND PRESERVING AND METERING METHOD IMPLEMENTING SUCH A SYSTEM

BACKGROUND

The present invention relates to a system for preserving and metering ingredients, together with a method for metering ingredients preserved in such a system.

The field of the present invention is the preservation of foodstuffs used in artisanal or semi-industrial processes, and more particularly the automated preparation of culinary preparations from these foodstuffs.

In a known manner, storage chambers are known that make it possible to preserve foodstuffs for long periods by means of low preservation temperatures in order to slow down or even prevent the development of germs and bacteria by said foodstuffs stored therein. These can be for example refrigerators, coolers or freezers depending on the storage temperatures chosen. The ingredients are placed in the storage chamber, optionally inside compartments, in order to optimize the arrangement thereof.

Automated machines are also known that produce culinary preparations, for example pizzas, by implementing storage tanks coupled with picking devices in order to pick, in a predetermined quantity, some of the ingredients preserved in the storage tanks. Each storage tank is then equipped with a motorized opening and closing mechanism in order to allow the extraction of the required quantity of ingredients.

The drawback of the systems implemented in such automated machines is the limitation on the number of different recipes that can generally be obtained. In fact, a compromise must generally be made between the number of storage tanks and the variety of possible recipes. According to a first variant, each tank can contain all of the ingredients necessary to prepare a given pizza recipe, that is, pizzas made from given types of ingredients. A sheeted pizza dough can then be placed below the tank for the selected recipe in order to receive all of the ingredients for that recipe simultaneously. The number of storage tanks necessary is then at least equal to the desired number of recipes to be obtained.

According to a second variant, each tank contains a limited number of types of ingredient, or even a single type of ingredient. Making varied recipes then involves providing as many tanks as types of ingredient forming the different recipes. One drawback of this second variant is that the sheeted pizza dough must then be moved below each tank containing one of the ingredients for the selected recipe. These successive movements result in the presence of a complex handling system that has a large space requirement. In practice, the space requirement of the storage tanks and the handling system makes it necessary to restrict the number of tanks, in order to limit the dimensions of the cooler, and therefore the manufacturing cost and energy consumption during use thereof. In addition, moving the pizza dough between the different tanks results in a relatively long ingredient loading time compared to the first variant. The total time taken to prepare a pizza is then extended.

Finally, for a given tank, the predetermined quantity of ingredients is generally loaded on the surface of the sheeted pizza dough by a complex system for moving said tank with respect to the sheeted pizza dough: either the sheeted pizza dough is loaded on a mobile carriage that moves below the tank dispensing the ingredients, or the tank moves over the sheeted pizza dough. The drawback of this loading system is that it is complex to implement and also consumes energy to ensure the relative movement of the pizza with respect to the tank from which the ingredients are dispensed. In addition, for a given programmed relative movement, the loading of said ingredients will be reproducible and such systems are not therefore compatible with the automated preparation of semi-traditional pizzas, for which the ingredients are not loaded in a totally reproducible manner from one pizza to another.

The object of the present invention is to overcome at least some of the problems set out above and also to result in other advantages.

Another purpose of the invention is to solve at least one of these problems by means of a new system for preserving and metering ingredients.

Another purpose of the present invention is to facilitate the management of a freezer and in particular the supply and preservation of the foodstuffs.

Another purpose of the present invention is to automate the extraction of the preserved foodstuffs.

Another purpose of the present invention is to reduce the energy consumption and the dimensions of a preservation chamber.

Another purpose of the present invention is to allow the precise selection of the type and quantities of foodstuffs extracted.

Another purpose is to speed up and simplify the loading of the foodstuffs on a substrate.

Another purpose of the present invention is to allow the loading of the foodstuffs evenly and randomly on a substrate during a single operation.

SUMMARY

According to a first aspect of the invention, at least one of the aforementioned objectives is achieved with a system for preserving and metering ingredients comprising:
  a preservation chamber comprising a set of compartments arranged to store ingredients,
  a device for picking and metering ingredients, arranged for picking or extracting a predetermined quantity of ingredients from each of the compartments, said device for picking and metering ingredients comprising:
    a collecting vessel arranged to temporarily store, in successive layers, the picked ingredients from each compartment,
    a controlled conveying mechanism, arranged so that it can move the collecting vessel in line with each compartment so that the picked ingredients from said compartment fall into the collecting vessel,
    a control unit, programmed to control the conveying mechanism and the picking and metering device.

The preservation chamber can comprise refrigeration means making it possible to maintain a temperature inside the chamber of less than 15° C., or to maintain dry storage conditions. Preferably, the refrigeration means make it possible to maintain a temperature inside the chamber of less than 4° C. in order to slow or stop the growth of bacteria and slow the undesirable chemical reactions on the preserved ingredients.

According to a preferred embodiment, the preservation chamber comprises freezing means arranged to maintain it at a temperature of less than 0° C., and preferably at a temperature comprised between −18° C. and −30° C.

The preservation chamber implemented in the first aspect of the invention comprises a plurality of compartments in which the ingredients are preserved. The compartments are arranged inside the preservation chamber so that the picking device can be positioned in proximity to each compartment in order to pick a predetermined quantity therefrom.

Generally, each compartment can adopt the form of a cylindrical receptacle the dimensions of which are adapted to the preservation of ingredients preferably cut into pieces and "ready to use" in a culinary preparation. By way of non-limitative example, the volume of each compartment can be between 0.5 litres and one hundred litres.

Depending on the culinary preparations prepared, the preserved ingredients can be of any type: fish, pre-cut fruits and/or vegetables, meat, cereals, pre-cut and/or grated cheeses, confectionery, portions of sauces and, generally, any type of foodstuffs used in preparing culinary preparations (flours, processed or unprocessed fruits and vegetables, pieces of chocolate, sugar, caramel, etc.).

Each compartment can comprise a closing means—at least partial—arranged to make it possible, in a first configuration, to retain all of the ingredients contained in said compartment and, in a second configuration, to permit the picking of at least some of the ingredients contained in said compartment by the picking and metering device. By way of non-limitative example, the closing means can consist of a removable flap arranged at a lower end of the compartment. The closing means can also comprise two pivoting leaves opening facing each other, or a diaphragm. According to a particular embodiment, the closing means forms part of the picking and metering device. The picking and metering device comprises for example an auger type mechanism. This mechanism can then perform the closing function, in particular when the opening of the compartment is situated at one end of an axis of rotation of the auger.

Preferably, each compartment is filled with a single type of ingredient so that the supply thereof can be managed more easily and accurately depending on the picking and consumption thereof, and personalized dishes can thus be offered. In this case, the preservation chamber can comprise a large number of compartments arranged in the preservation chamber. It is thus easier to anticipate the replenishment of the ingredients. In addition, in the event that some of the ingredients preserved in the preservation chamber are contaminated or unsuitable for consumption, it is then possible to dispose of them and replace them while preserving the other ingredients that are not contaminated and/or unsuitable for consumption. More generally, the preservation chamber implemented in the first aspect of the invention allows improved sanitary management of the preserved ingredients.

Optionally, according to a particular embodiment, each compartment can be sealed in order to further reduce the risk of contamination between compartments.

By way of non-limitative example, the preservation chamber implemented in the first aspect of the invention can comprise between 2 and 200 compartments.

Advantageously, the space situated in front of each compartment is sufficient to allow the movement of the picking device.

Optionally, the preservation chamber comprises a door allowing on the one hand, easy and simultaneous access to all of the compartments to facilitate the filling thereof and/or maintenance operations, and on the other hand the sealed closure of said preservation chamber in order to limit heat losses.

Optionally, the preservation chamber also comprises a plurality of filling flaps situated on the outer lateral walls, each of the filling flaps making it possible to fill and/or clean one or more adjacent compartments without opening the optional preservation chamber door. In addition, a filling pipe can connect each compartment to the filling flap with which it is associated, depending on the thickness of the lateral wall of the preservation chamber and/or the position of said compartment in the preservation chamber. It is thus possible to carry out the supply of ingredients while limiting the heat losses, energy consumption and operating costs of the preservation chamber.

Generally, the compartments are preferably arranged inside the preservation chamber so that the picking device can move in at least one direction to engage with each compartment and pick the predetermined quantity of ingredients.

According to an advantageous embodiment, the picking device is arranged to move in two perpendicular directions in the preservation chamber, or also in three perpendicular directions.

According to the first aspect of the invention, the device for picking and metering ingredients is suitable for moving successively in line with or in proximity to each compartment. The movement is carried out by a conveying mechanism arranged to ensure movement along one, two or three axes, successively or simultaneously, inside the preservation chamber, depending on the organisation of the compartments therein.

The conveying mechanism can comprise a guidance system along one, two or three axes in order to guide the picking and metering device towards any of the compartments present in the preservation chamber. An actuator placed on each of the axes of movement makes it possible to control the movement of the device along each axis independently.

The control unit is programmed to control in particular at least one actuator of the conveying mechanism.

For a movement of the picking device along a single axis inside the preservation chamber, the conveying mechanism can comprise for example a first, or primary, guide rail, preferentially oriented in the direction of the largest inner dimension of the preservation chamber and for example secured to a wall of the preservation chamber. A motorized mobile element, known as the primary motorized mobile element, is mounted in slidable connection with the primary guide rail.

In this configuration, all of the compartments are preferably aligned in a single direction parallel to the direction of the first guide rail inside the preservation chamber, so that the ingredient picking device can stop in proximity to each compartment in order to pick a predetermined quantity of ingredients therefrom.

For a movement of the picking device along two axes inside the preservation chamber, the first primary guide rail can be associated with a second primary guide rail, preferably arranged on the surface opposite the one to which the first primary guide rail is secured and oriented in a direction parallel to that of the first primary guide rail. The second primary guide rail then comprises a second primary mobile element, in slidable connection with said second primary guide rail. Optionally, the second primary mobile element can be motorized.

The two primary mobile elements are then connected to each other by another guide rail, known as the secondary guide rail, oriented substantially in a direction perpendicular to that of the primary guide rails. Thus, when the at least one motorized primary mobile element is actuated, it drives the secondary rail in translation in the direction of the primary guide rails. A motorized mobile element, known as the secondary motorized mobile element, is mounted in slidable connection on the secondary guide rail in order to perform the translation.

In this configuration, all of the compartments are preferably arranged in a plurality of rows and columns on one or more inner faces of the preservation chamber, so that the ingredient picking device can stop in proximity to each compartment in order to pick a predetermined quantity of ingredients.

Finally, for a movement of the picking device along three axes inside the preservation chamber, a tertiary guide rail in a direction perpendicular to the primary and secondary guide rails can be secured to the secondary mobile element. A tertiary motorized mobile element is then mounted in slidable connection on the tertiary guide rail so that it generates movement in this direction.

In this configuration, the ingredient picking device can thus move inside the entire preservation chamber, offering more options for the organisation of the compartments inside the preservation chamber. In addition, the storage capacity is increased. By way of non-limitative example, in such a configuration, the preservation chamber could accommodate compartments on at least two opposite surfaces, or on all of the inner walls of the preservation chamber. Preferably, the compartments are organized in rows and columns so that the picking device can stop in proximity to each compartment and pick a predetermined quantity of ingredients.

The control unit is programmed to control the movements of the at least one motorized mobile element in order to position it in particular in proximity to at least some of the compartments in order to pick a predetermined quantity of ingredients therefrom, and the quantity of picked ingredients can differ depending on the compartment.

For all of the configurations mentioned above, the position of the mobile elements along the corresponding guide rail as well as the position of each compartment can be determined by calibration. Optionally, the position of each mobile element along each guide rail can be measured using sensors installed in the preservation chamber or indexing devices built into the mobile elements.

The picking device comprises a collecting vessel suitable for temporarily storing the ingredients picked from each compartment selected. Thus, when a picking command is sent by the controller to said picking device, for example according to a predetermined recipe, the conveying mechanism sequentially moves the collecting vessel in proximity to each compartment comprising an ingredient of the picking command and/or the predetermined recipe. The collecting vessel can in particular be positioned in line with each compartment or, more specifically, in line with the outlet port of each compartment. For each compartment, the picking device forms a coupling between the collecting vessel and the compartment in order to pick the predetermined quantity of ingredients. The details of this coupling will be described below. When the picking of the ingredients contained in a compartment is complete, the picking device uncouples the collecting vessel from said compartment and moves to the next compartment selected. Thus, for a given picking order and/or a given recipe, all of the ingredients are picked during a single picking cycle comprising a plurality of picking steps.

Advantageously, the collecting vessel also comprises motorized emptying means arranged to adopt at least two configurations: a first, configuration known as closed configuration that makes it possible to retain all of the ingredients contained in the collecting vessel, and a configuration known as open configuration making it possible to empty the collecting vessel of all of the ingredients. The motorized emptying means is preferentially situated on a lower surface of the collecting vessel so that the ingredients that it contains are discharged under the effect of gravity alone. By way of non-limitative examples, the emptying means can comprise at least one motorized mobile flap, a motorized diaphragm, a spring or magnet mechanism with opening and/or closing by mechanical stop, or any other equivalent mechanism.

It is thus possible to automate the picking of the ingredients preserved in the preservation chamber and to be able to select accurately the type and quantities of picked ingredients.

Preferably, the device for picking and metering ingredients of the preservation system according to the first aspect of the invention also comprises a device for measuring the weight and/or the volume of the ingredients during picking, the control unit being programmed to stop the picking of the ingredients from a compartment when the predetermined quantity of ingredients has been picked.

By way of non-limitative examples, the device for measuring the weight of the ingredients during picking can be a weighing device secured below the collecting vessel measuring the instantaneous weight of said collecting vessel during the picking operation (and filling operation of said collecting vessel). Typically, the weight sensor is arranged and configured in order to measure the weight of the collecting vessel over a sampling period that is significantly shorter than the picking time. It is thus possible to determine the quantity of ingredients during extraction and better determine the conditions for stopping said extraction of the ingredients.

Alternatively or additionally, a volume sensor can be implemented on the device for picking and metering the extracted ingredients in order to determine the volume of said extracted ingredients. In fact, for certain particular culinary preparations, the proportions of ingredients necessary are defined in terms of volume rather than weight.

According to a particular configuration, such a volume sensor can comprise for example a plurality of laser diodes arranged to define an optical comb along a measurement plane substantially perpendicular to the falling direction of the extracted ingredients. Each laser diode is also coupled to a photodetector arranged opposite thereto so that when an ingredient is extracted from a compartment, it cuts the beam of at least one laser diode. In other words, the laser diode and photodetector assembly is arranged to cover the entire falling area of the picked ingredients from a compartment to the collecting vessel.

Preferentially, an extracted ingredient falling towards the collecting vessel cuts the beam of at least two laser diodes situated at a maximum of 60° to each other.

The photodetectors are for example arranged and configured to record the light intensity emitted by the laser diodes situated opposite them at a sampling frequency that is sufficiently high to record at least ten intensity measurements per extracted ingredient. By way of non-limitative example, the sampling frequency is at least greater than 10 kHz.

Thus, each photodetector makes it possible, by integrating the measurements taken for an extracted ingredient falling into the collecting vessel, to calculate an infinitesimal volume of said ingredient, calculated on the basis of the width of the optical beam and the time measured between the crossing of the beam by a lower end of the ingredient (corresponding to a sudden attenuation of the measured light intensity and the crossing of the beam by the upper end of said ingredient (corresponding to a reincrease in the measured light intensity).

By combining the laser diodes and the photodetectors, it is thus possible to calculate the volume of each ingredient that has crossed the optical comb.

By way of example, the calculation of an infinitesimal volume can be obtained from the dimensions of the photodetector and the time thus calculated in view of the light intensity variation curves. The total volume of an ingredient can be calculated by the sum of at least some of the infinitesimal volumes.

Advantageously, in the preservation system according to the first aspect of the invention or to one of the improvements thereof, the conveying mechanism is arranged so that it can move the collecting vessel into an unloading configuration, in which the collecting vessel is situated in line with the substrate, and the collecting vessel is also arranged so that it can load the ingredients picked from the compartments on or in the substrate.

It is thus possible to prepare culinary preparations from a predefined recipe, and according to ingredients selected in quantities suitable for said recipe. To this end, the substrate of the culinary preparation is placed below the picking and metering device in the preservation chamber, so that the ingredients contained in said picking and metering device are dispensed thereon. The substrate can be edible.

The type of substrate varies depending on the culinary preparation in question. It can for example be bread dough, shortbread dough, shortcrust pastry, flaky pastry or, generally, any dough or pastry suitable for use as a base or binder for the ingredients. The dough can be sheeted, for example to prepare a pizza, or placed in a mould, for example to prepare a quiche.

The device according to the invention is also arranged to prepare recipes of ingredients consumed raw, for example at breakfast, such as cereal mixes and fruit salads. In some cases, the substrate may not be edible; this can be for example glasses, cups, bowls or plates.

Optionally, the different substrates, edible or inedible, are stored in the preservation chamber and transferred on demand by a conveying mechanism below the picking and metering device in order for the ingredients picked and contained in said picking and metering device to be loaded thereon.

Alternatively, the substrates are imported "on demand" into the preservation chamber by a conveying mechanism to below the picking and metering device in order for the ingredients picked and contained in said picking and metering device to be loaded thereon. Optionally, a motorized access flap on the preservation chamber makes it possible to perform this transfer and to introduce the substrate into the preservation chamber or extract the substrate from the preservation chamber. In its open configuration, it allows the substrate to be transferred below the picking and metering device so that it can receive the selected ingredients there. In its closed configuration, the access flap ensures the sealed closure of the preservation chamber in order to limit energy losses.

When the picking and metering device has picked the ingredients in determined quantities from all of the compartments selected to prepare said recipe, the controlled conveying mechanism moves the picking and metering device so that the collecting vessel and the substrate on which the ingredients are loaded are vertically aligned.

More generally, the picking device is positioned above the substrate in such a way that the ingredients fall under the effect of gravity from the collecting vessel onto the substrate.

As mentioned previously, the picking and metering device engages with each compartment in order to pick a predetermined quantity of ingredients. This engagement can take place according to three embodiments that will now be described in more detail.

According to a first embodiment of the invention according to any one of the improvements, each compartment can comprise:
 an extraction element arranged so that it can pick some of the ingredients contained in said compartment;
 a motor unit arranged so that it can actuate the extraction element, in particular when it engages with said picking and metering device;
the picking and metering device being configured so that it can have at least two configurations:
 a configuration known as coupled configuration, in which the collecting vessel is placed in line with one of the compartments in order to engage with said compartment and so that it can collect the extracted ingredients;
 a configuration known as uncoupled configuration, in which the picking and metering device is suitable for moving to another compartment and/or to the unloading configuration.

According to this first embodiment, each compartment comprises the elements that allow the controlled picking of the ingredients contained. These are on the one hand the extraction element, and the motor unit that controls the extraction element.

Generally, the extraction element can adopt at least the following two configurations.

A first configuration known as through configuration, making it possible to extract in a controlled manner some of the ingredients contained in the corresponding compartment. Depending on the type of extraction element, the through configuration can be static or dynamic, depending on whether the extraction element is immobile or moving, respectively. By way of non-limitative examples, in the vent that the extraction element comprises an auger a first portion of which is inside the compartment and a second portion of which is outside, the through configuration is dynamic through the rotation of the auger; on each revolution of the auger, a given quantity of ingredients is conveyed from the inside of the compartment to the outside. Alternatively, a through configuration is static if the extraction element adopts an immobile position in which some of the ingredients contained in the compartment can be extracted without requiring movement of the extraction element. By way of non-limitative example, this can be a flap situated on the lower portion of the compartment. When the flap is in the open configuration, the ingredients contained in the compartment can fall out of the compartment under the effect of gravity alone. By adjusting the opening of the flap, the speed of extraction of the ingredients can be controlled.

A second configuration known as closed configuration that allows all of the ingredients to be retained in the compartment.

The motor unit is arranged to actuate the extraction element, on the one hand to make it pass from one configuration to another, and optionally to actuate the extraction element in the dynamic through configuration. It can for example be a stepping motor arranged to drive a shaft in rotation that causes an auger to turn or a flap to pivot.

In this first embodiment, the picking and metering device is arranged to engage with each compartment, preferably one after another. Generally, the picking and metering device can adopt two alternative configurations.

A first configuration known as coupled configuration, in which the picking and metering device is situated in proximity to a compartment in order to permit the extraction of some of the contained ingredients and collect them in the collecting vessel. In this coupled configuration, the extraction element can be switched from the closed configuration to the through configuration in order to extract a predetermined quantity of ingredients out of the compartment. When the predetermined quantity is reached, the extraction element is switched back to the closed configuration. Optionally, in this configuration, the picking and metering device establishes a temporary and reversible connection with the compartment in order to form a mechanical coupling and maintain the relative position of the picking device with respect to said compartment during the extraction of the ingredients.

A second configuration known as uncoupled configuration, in which the picking device is free to move from one compartment to another, or optionally to another configuration.

According to a second embodiment in accordance with any one of the improvements of the first aspect of the invention, the picking and metering device can comprise:
an extraction element arranged so that it can engage successively with each compartment in order to extract some of the ingredients contained in the compartment with which the extraction element is engaged;
a motor unit arranged so that it can actuate the extraction element when it engages with one of said compartments;
said picking and metering device being configured so that it can have at least two configurations:
a configuration known as coupled configuration, in which the extraction element is coupled to one of the compartments in order to extract some of the ingredients therefrom to the collecting vessel;
a configuration known as uncoupled configuration, in which the extraction element is uncoupled from each compartment in order to allow the picking and metering device to be able to move to another compartment and/or to the unloading configuration.

According to this second embodiment, the extraction element and the motor unit are no longer incorporated into each compartment, but are both implemented on the picking and metering device in order to jointly extract the ingredients contained in the compartments in a controlled manner.

Optionally, each compartment can also comprise a closing means arranged to prevent the ingredients contained in said compartment from falling out of the compartment when it is not engaged with the picking and metering device. This can for example be a passive element, such as a valve, or a dynamic element, such as a motorized flap.

In a manner comparable to the first embodiment, the extraction element situated on the picking and metering device can alternatively have at least one through configuration—static or dynamic—and a closed configuration.

In a manner comparable to the first embodiment, the picking and metering device is arranged to engage with each compartment, preferably one after another, and by means of two alternative configurations.

A first configuration known as coupled configuration, in which the picking and metering device establishes a temporary and reversible connection with the compartment with which it is engaged. In this coupled configuration, the extraction element can be switched from the closed configuration to the through configuration in order to extract a predetermined quantity of ingredients out of the compartment. When the predetermined quantity is reached, the extraction element is switched back to the closed configuration.

A second configuration known as uncoupled configuration, in which the picking and metering device and the compartment are no longer coupled, optionally allowing the picking and metering device to move from one compartment to another.

This embodiment ingeniously makes it possible to limit the number of mobile elements and/or motors necessary for the extraction of the ingredients contained in the compartments. It also makes it possible to reduce the production cost of the preservation and metering system according to the invention.

According to a third embodiment of the invention according to any one of the improvements thereof:
each compartment comprises an extraction element arranged so that it can engage with the picking and metering device and pick some of the ingredients contained in said compartment;
the picking and metering device comprises a motor unit arranged so that it can engage successively with each compartment so that it can actuate the extraction element of the compartment with which it is engaged;
said picking and metering device being configured so that it can have at least two configurations:
a configuration known as coupled configuration, in which the motor unit is coupled to the extraction element of one of the compartments so that it can actuate the extraction element of said compartment and pick some of the ingredients from said compartment to the collecting vessel;
a configuration known as uncoupled configuration, in which the motor unit is uncoupled from each extraction element in order to allow the picking and metering device to move to another compartment and/or to the unloading configuration.

This third embodiment constitutes an intermediate configuration between the two embodiments described previously. In fact, in this embodiment, an extraction element is implemented on each compartment, whereas the motor unit is implemented in a shared manner on the picking and metering device.

In a manner comparable to the first and second embodiments, the extraction elements situated on each compartment can alternatively adopt at least a through configuration—static or dynamic—and a closed configuration.

In a manner comparable to the first and second embodiments, the picking and metering device is arranged to engage with each compartment, preferably one after another, and by means of two alternative configurations.

A first configuration known as coupled configuration, in which the picking and metering device establishes a temporary and reversible connection between the motor unit situated on said picking and metering device and the extraction element situated on each compartment. Once the coupling has been formed, the extraction element can be switched from the closed configuration to the through configuration in order to extract a predetermined quantity of ingredients out of the compartment. When the predetermined quantity is reached, the extraction element is switched back to the closed configuration.

A second configuration known as uncoupled configuration, in which the motor unit of the picking and metering device and the extraction element of the compartment are no longer coupled, optionally allowing the picking and metering device to move from one compartment to another.

This embodiment ingeniously makes it possible to simplify the design of the compartments and the operation of the preservation and metering system according to the invention. In fact, the preservation of the ingredients inside each compartment can be ensured entirely by the extraction element, which is integral with said compartments and is switched to its through configuration only during coupling with the motor unit of the picking device, said extraction element being able to return to its closed configuration once the motor unit is uncoupled. It is also possible to select and extract ingredients out of the preservation chamber more quickly, making it possible to prepare recipes from said ingredients more quickly.

Optionally, the extraction element of the preservation system according to the first aspect of the invention or one of the improvements thereof can comprise an auger type mechanism, the mechanism comprising an auger the geometry, in particular the pitch, and the rotating speed of which make it possible to control the quantity and extraction rate of the ingredients.

This extraction element makes it possible to very simply obtain both the through configuration, by rotating the auger, and the closed configuration, by keeping said auger in a given position. In fact, if non-liquid ingredients are contained in the compartment, the immobile position of the auger makes it possible to retain the ingredients and prevent them from falling out of the compartment under the effect of gravity alone.

Optionally, the axis of rotation of the auger slopes towards a rear surface of the compartment so that, when the auger is driven in rotation to extract the ingredients contained in said compartment (picking configuration), the ingredients are conveyed by the auger from a position situated lower down in the compartment to a raised position before being expelled out of said compartment. This arrangement of the axis of rotation of the auger inside the compartment makes it possible to improve the retention of the ingredients when said auger is idle (storage configuration).

Preferentially, each compartment comprises an internal tube surrounding the front portion of the auger situated inside the compartment. This internal tube thus forms a path for the ingredients conveyed by the auger to travel towards the outside of the compartment.

Each compartment can comprise, instead of or as well as the internal tube, a partial closing element situated on an outlet port of the compartment. This closing element can have an opening diameter smaller than the diameter of the auger. It is then made from a flexible material, so that it can deform when the auger rotates. The closing element comprises for example a set of tabs extending concentrically from the edge of the outlet port. The partial closing element makes it possible to limit the volume of ingredients conveyed by the auger. According to a second aspect of the invention, a distribution device is proposed, suitable for being situated in an intermediate position between a tank of ingredients situated above said distribution device and a substrate onto which the ingredients must be dispensed, and arranged so as to allow an even and random distribution on said substrate of the ingredients passing through the distribution device.

Preferably, the ingredients picked from the tank fall through the distribution device under the effect of gravity alone, for example by the opening of a flap situated on the lower portion of said tank. Schematically, the extracted ingredients from the tank fall, preferably in free-fall, through the distribution device. The extracted ingredients from the tank arrive with non-zero kinetic energy the speed vectors of which are mainly oriented in a vertical direction, the transverse elements being zero or significantly smaller than the vertical elements.

The distribution device is arranged to modify the trajectory of the ingredients passing through it, so that they acquire non-zero speed in at least one direction substantially transverse to the direction of fall of said ingredients, thus resulting in the ingredients passing through said distribution device being dispersed transversely and randomly.

Advantageously, the distribution device laterally disperses the ingredients passing through it in a completely passive manner, i.e. without implementing any motorized elements.

In addition, the distribution device can disperse the ingredients in a plurality of directions transverse to the fall of said ingredients without energy being supplied in addition to the mechanical energy accumulated by said falling ingredients.

More particularly, the device for the distribution of ingredients can comprise a mixing cylinder placed above the substrate, for example a sheeted dough, a longitudinal axis of the mixing cylinder being perpendicular to the surface of the substrate, the mixing cylinder comprising, between an upper end and a lower end, obstacles arranged to obstruct the free-fall of the ingredients, in such a way as to generate random lateral movement of the ingredients to distribute them randomly and evenly on the surface of the substrate.

The lateral dimensions of the distribution device are adapted to the lateral dimensions of the substrate on which the ingredients are loaded, so that all of the ingredients passing through the distribution device ultimately fall onto the substrate. More particularly, the outer dimensions of the mixing cylinder are smaller than the outer lateral dimensions of the substrate on which the ingredients are loaded. By way of example, if the substrate is a sheeted dough for the preparation of a pizza, the mixing cylinder can advantageously adopt the form of a cylinder the directrix curve of which is a circle, the diameter of said circle being slightly smaller than the diameter of the sheeted pizza dough, for example by several percent.

The distribution device thus implements a series of obstacles that obstruct the free-fall of the ingredients passing through it. Depending on the dimensions and orientation of said obstacles on the one hand, and the dimensions and the point of impact of each ingredient with at least one obstacle, the trajectory of each ingredient touching an obstacle will be diverted in a random lateral direction.

The obstacles implemented along the length of the mixing cylinder are arranged to ensure an even distribution of the ingredients passing through it. To this end, the obstacles are preferably oriented in a plurality of directions, in particular radial, so that no particular rebound direction is favoured.

Preferentially, the device for the distribution of ingredients can also comprise a first distribution stage arranged to disperse the ingredients originating from the tank or collecting vessel radially around the longitudinal axis, said first distribution stage being situated above or in the upper portion of the mixing cylinder.

Advantageously, the first stage is made from a material compatible with food hygiene standards, such as for example food-grade stainless steel or polyoxymethylene copolymer (POM-C).

The first distribution stage makes it possible to obtain improved dispersal of the ingredients on the substrate. In fact, when the distribution device is implemented, the tank containing the ingredients is aligned vertically above said distribution device. More particularly, the tank is centred with the distribution cylinder, its diameter preferentially being smaller than the diameter of the mixing cylinder. When the tank is opened so that the ingredients that it contains fall out of said tank and through the distribution device, it is preferable to project said ingredients towards the outer wall of the mixing cylinder in order to improve the distribution thereof, in particular on the peripheral areas of the substrate.

Preferentially, the first distribution stage is arranged to disperse said ingredients radially, without in particular favouring one direction.

According to a particular embodiment, the first distribution stage can comprise a conical surface that extends laterally inside the mixing cylinder, said first distribution stage being aligned co-axially with the mixing cylinder, at least one obstacle being secured to said mixing cylinder extending from said conical surface, so that an ingredient falling the length of the first distribution stage is projected beyond the conical surface onto said at least one obstacle.

This ingenious configuration makes it possible to ensure favourable initiation of the even and random distribution of the ingredients on the substrate situated below. All of the ingredients falling from the tank situated above are thus projected laterally towards the periphery of the mixing cylinder, and at least some of them, when they reach the wall of said mixing cylinder, rebound onto a first obstacle and are redirected, preferably in a central direction of said mixing cylinder.

According to an advantageous configuration of the first aspect of the invention, the mixing cylinder also comprises separators dividing said mixing cylinder longitudinally into several sectors. It is thus possible to define several regions on the substrate.

The separators comprise for example plates oriented on the one hand in the direction of a generatrix of the mixing cylinder, and on the other hand radially to the directrix curve of said mixing cylinder, so that they divide the cylinder longitudinally into several sectors. The longitudinal dimensions of the separators are such that they do not extend outside the mixing cylinder. And preferentially, the lower edge of the separators is set back slightly with respect to the lower edge of the mixing cylinder so as to ensure that there is no contact between the substrate and the separators and that the ingredients are loaded onto the substrate at the level of the separators.

The separators are advantageously made from a material compatible with food hygiene standards, such as for example stainless steel.

Optionally, a controlled, motorized system for closing each sector, situated above each sector and, if applicable, below the first distribution stage, can prevent ingredients from being loaded on a particular region of the substrate. According to a particular use, such a system for closing each sector can make it possible to load ingredients randomly and evenly inside a particular sector, thus making it possible, for example, to prepare culinary preparations composed of several combinations of ingredients, each combination of ingredients being loaded randomly and evenly inside a particular region of the substrate.

In the case of the distribution of toppings on the surface of a sheeted pizza dough, such a closing system can thus make it possible to produce a pizza made up of several different recipes on each sector. To this end, the contents of the tank made up initially of the ingredients of a first recipe are dispensed onto the distribution device on which all of the sectors apart from one are closed by means of the closing system according to this variant of the invention. The ingredients are then distributed evenly and randomly within said sector and on the sheeted pizza dough. Then, the tank is supplied again with the ingredients of a second recipe. These ingredients are then dispensed through the distribution device, another single sector of which is open, the ingredients then being distributed evenly and randomly on the surface of the second sector of the sheeted pizza dough. The process is repeated as many times as necessary depending on the number of sectors, the sheeted pizza dough and the desired result.

According to another particular use of this variant, it is possible to load ingredients on several substrates situated below the picking device. For ease of understanding, an example is given for a particular recipe, but the latter is in no way limitative of the device according to the invention. Thus it is assumed that the tank comprises several cereals and several pieces of different fruits, as well as pieces of chocolate. By placing several bowls below the distribution device, and more particularly by placing one bowl below each sector of the mixing cylinder, it is possible to distribute the contents of said tank into the different bowls by alternately opening and closing the system for closing each sector.

Optionally, the picking device can also be placed above a single sector of the mixing cylinder in order to load exclusively inside said sector at least some of the ingredients contained in said tank.

Advantageously, the picking device can be placed successively above each sector of the mixing cylinder in order to load successively and specifically inside each sector of the mixing cylinder.

Preferably, obstacles can be secured on the separators of the mixing cylinder, ingeniously making it possible to improve the evenness of the ingredients on the substrate. Thus, each sector ensures the random and even distribution of the ingredients that pass through it onto the corresponding sector of the substrate situated below, independently of the other sectors.

Advantageously, the obstacles can comprise guides having a flat and/or cylindrical contact surface, such as for example strips and/or rods, said guides being secured by at least one of their ends to an inner surface of the mixing cylinder, at different heights along its longitudinal axis and extending in a plurality of directions.

The guides comprise physical obstacles that obstruct the free-fall of the ingredients inside the mixing cylinder. The dimensions, orientation, number and arrangement thereof inside the mixing cylinder make it possible to ensure the even, radial distribution of the ingredients on the substrate. Generally, the obstacle density is such that an ingredient falling inside the mixing cylinder should meet at least one obstacle during its fall.

The obstacles are distributed at different heights in order to promote multiple rebounds during the fall of the ingredients inside the cylinder.

Preferentially, in a plane transverse to the generatrices of the mixing cylinder, the obstacles are preferentially oriented in multiple directions in order to optimise the random and even distribution of the ingredients. This advantageous configuration surprisingly promotes the dispersal of the ingredients passing through the mixing cylinder in a transverse direction and improves the evenness of distribution on said substrate.

The obstacles are advantageously made from materials that make the use thereof compatible with the agri-food field, such as for example stainless steel or a material of the polyoxymethylene copolymer (POM-C) type.

The obstacles generally have at least one dimension larger than one of the dimensions of the ingredients passing through the distribution device. For example, the strips can have a length of between 15 and 30 mm for a thickness of less than one millimeter, while the rods can have a diameter comprised between 0.5 and 3 mm for a length of more than 50 mm.

Typically, the obstacles with a flat contact surface are arranged to make it possible to move the ingredients away from the outer walls of the mixing cylinder.

In addition, the obstacles with a cylindrical contact surface are arranged to randomly distribute the ingredients by means of agitation in order to optimize and homogenize the mixing thereof.

Advantageously, the distribution device according to any one of the improvements of the second aspect of the invention can be implemented in the preservation system of the first aspect of the invention. The distribution device is then suitable for being situated in an intermediate position between the collecting vessel and the substrate when the collecting vessel is in the unloading configuration. In this case, the tank from which the ingredients fall through the distribution device can advantageously be the collecting vessel of the picking and metering device of the preservation system.

According to a third aspect of the invention, a method for metering and placing ingredients on a substrate using a preservation and metering system according to any one of the preceding claims is proposed, characterized in that it comprises, for a predetermined selection of ingredients for picking:

for each compartment comprising at least some of the ingredients of said selection:
 moving the collecting vessel towards said compartment;
 coupling the picking and metering device to the compartment so that ingredients can be picked from said compartment;
 picking the predetermined quantity of ingredients contained in said compartment and conveying it to the collecting vessel;
when all of the ingredients of said selection have been picked:
 uncoupling the picking and metering device from the compartment;
 moving the collecting vessel into the unloading configuration;
 opening the collecting vessel in order to dispense the ingredients that it contained onto a substrate placed below the collecting vessel.

According to a fourth aspect of the invention, the use of the system according to any one of the improvements of the first aspect of the invention is proposed for the selection and loading of ingredients on a sheeted pizza dough.

According to a fifth aspect of the invention, an automated machine for making culinary preparations is proposed, comprising:

a system for preserving and metering ingredients according to any one of the embodiments of the system according to the first aspect of the invention, comprising a making-up station, said ingredients being suitable for use in making said culinary preparations;
a device for cooking culinary preparations;
a handling system arranged so that it can introduce a support for a culinary preparation into the preservation and metering system and in order to be able to transfer the culinary preparation from the preservation and metering system to the cooking device;
a processing unit programmed to control said automated machine so as to prepare a culinary preparation according to a predetermined recipe.

According to this fifth aspect of the invention, the preservation and metering system according to any one of the embodiments of the first aspect and/or the distribution device according to any one of the improvements of the second aspect according to the invention can be incorporated into an automated machine for making "to order" and "takeaway" culinary preparations, such as for example an automated machine for producing pizzas. The system according to the invention can thus be incorporated into an automated line and allow on the one hand the selection and picking of ingredients in predetermined quantities depending on particular recipes, and/or the loading and the random and even distribution of said picked ingredients on a substrate of the culinary preparation, for example a sheeted pizza dough. Such an automated machine can thus completely independently ensure the lean production of culinary preparations to order and with customisation of the dishes.

Various embodiments of the invention are envisaged, incorporating the different optional features set out herein according to all of the possible combinations thereof.

BRIEF DESCRIPTION OF THE DRAWINGS

Other characteristics and advantages of the invention will become apparent from the following description on the one hand, and from several embodiments given by way of non-limitative example with reference to the attached diagrammatic drawings on the other hand, in which.

DETAILED DESCRIPTION

The embodiments which will be described below are in no way limitative; it is possible in particular to imagine variants of the invention comprising only a selection of characteristics described below in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, the elements common to several figures retain the same reference.

Figure 1:
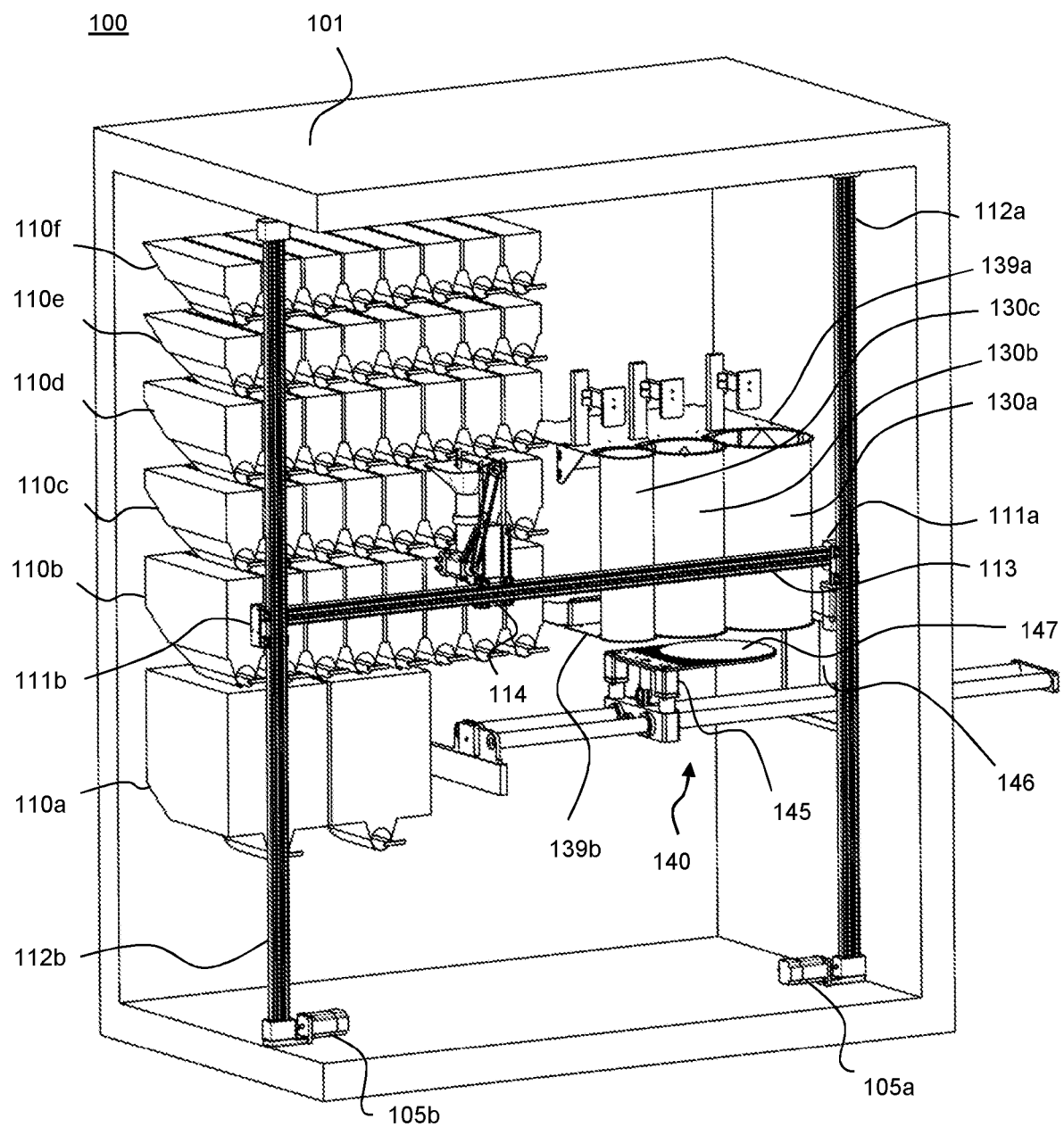
FIG. 1 shows a perspective view of the preservation and metering system according to the invention.

With reference to FIG. 1, the preservation and metering system 100 comprises a preservation chamber 101, said preservation chamber being arranged to preserve a plurality of ingredients, preferably stored in separate compartments, each compartment only comprising one type of ingredient.

Figure 2:
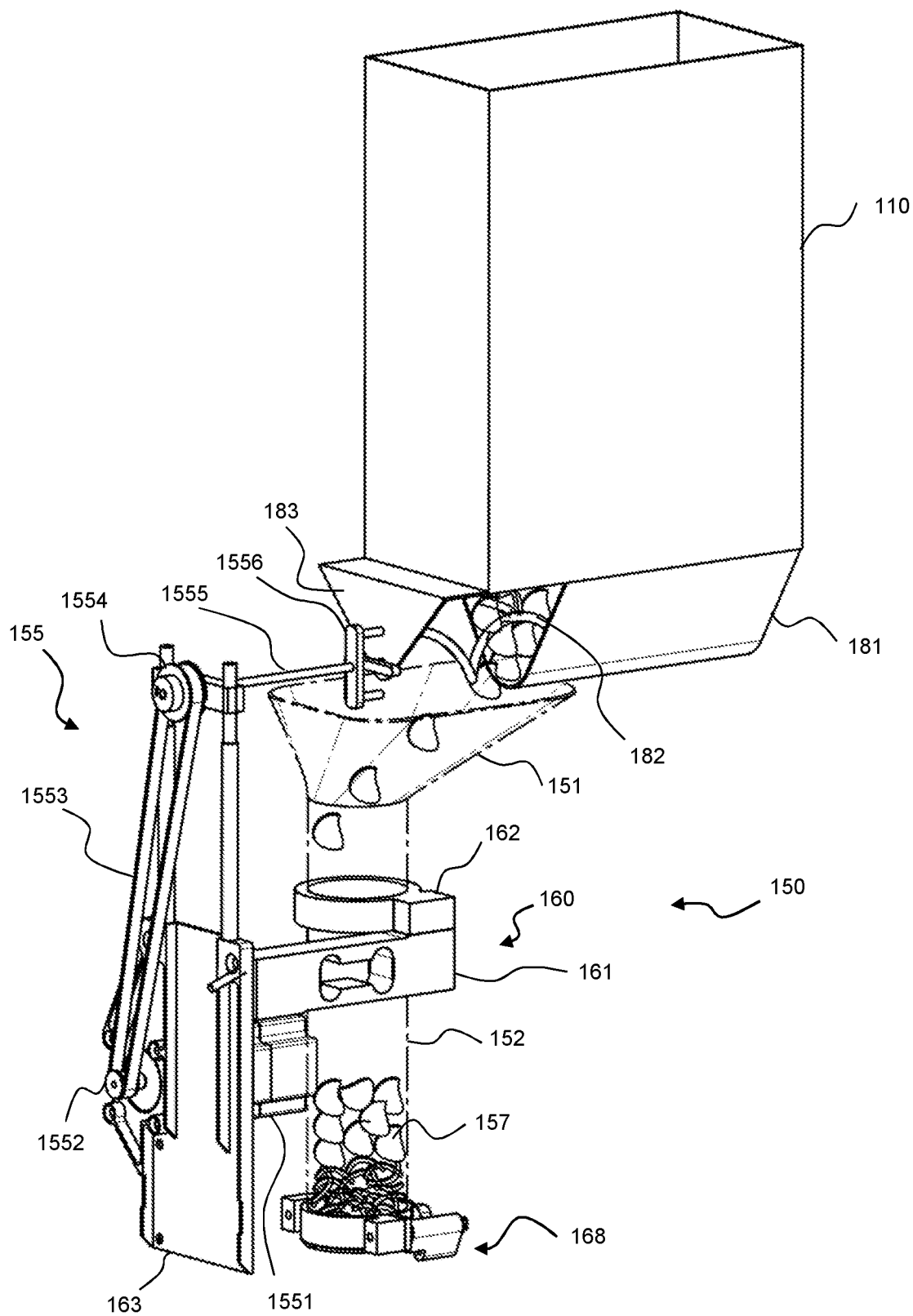
FIG. 2 shows a detailed view of the picking and metering device engaging with a compartment.

According to FIGS. 1 and 2, the preservation and metering system according to the first aspect of the invention comprises a preservation chamber 101. Inside the preservation chamber, a plurality of compartments 110 makes it possible to store ingredients individually. A picking and metering device 150 makes it possible to pick a predetermined quantity of ingredients from each compartment 110 by means of a conveying mechanism. A secondary conveying device 140 makes it possible to make a substrate 147 enter or leave the preservation chamber 101, transported by a conveying carriage 145 from a flap 146 situated on a lateral surface of said preservation chamber 101. In the unloading configuration, the conveying carriage 145 is positioned below the distribution device so that the picked ingredients in the picking and metering device 150 situated above said distribution device are loaded randomly and evenly on the substrate 147.

A door, (not shown for greater clarity) situated on a front face of the preservation chamber 101, makes it possible to alternately open said preservation chamber 101 in order to access the compartments 110 situated therein, or close said preservation chamber 101, preferably in a sealed manner.

According to an advantageous embodiment, the preservation chamber 101 can comprise refrigeration or freezing means (not shown) in order to maintain an appropriate temperature for preserving the stored ingredients.

The preservation chamber 101 comprises a plurality of compartments 110. The compartments are preferentially organized in a plurality of rows 110a-110f and extend from a lateral surface of the preservation chamber 110 towards the opposite lateral surface. The space between two consecutive rows is sufficient to allow the picking and metering device 150 to move between the compartments 110, and engage with them. Laterally, the compartments 110 are preferably adjacent to each other in order to minimize the occupation of the internal volume of the preservation chamber 101.

Advantageously, all of the compartments of one and the same row have the same dimensions, each row being able to comprise a different number of compartments. In the example shown in FIG. 1, the first row 110a comprises two compartments only, while rows 110b-110f each comprise eight compartments. In addition, in the example shown in FIG. 1, the heights of the compartments in each row are all different, the heights of the compartments in the upper rows being smaller than the heights of the compartments situated in the lower rows. The compartments will be described in more detail with reference to FIG. 2.

The picking and metering device 150 comprises a conveying mechanism that makes it possible to move a collecting vessel 151, 152 between each compartment 110 in order to engage with one of them to pick a predetermined quantity of ingredients.

The conveying mechanism shown in FIGS. 1 and 2 comprises two axes of movement, along which the picking and metering device 150 can be actuated alternately or simultaneously as required, in particular in order to minimize the movement time between two compartments 110. The first axis of movement is aligned with the largest dimension of the preservation chamber 101, in this case vertical. It is embodied by two main rails 112a and 112b secured respectively to two opposite walls of the preservation chamber 101 using fastening means.

On each of the main rails 112a and 112b, a sliding block 111a and 111b is mounted in slidable connection to allow it to move along the corresponding main rail. A motor unit 105, made up of two motors 105a, 105b, makes it possible to control the movement of each sliding block 111 along the corresponding main rail. The motors 105a and 105b can be synchronized.

A secondary rail 113 connects the two sliding blocks 111 in order to define a second axis of movement of the picking and metering device 150, transverse to the main rails 112.

In a similar manner, a sliding block 114 is mounted by means of a slidable connection on the secondary rail 113 so that it can move along said secondary rail 113, transversely to the main rails 112.

The sliding block 114 supports the picking and metering device 150, which will be described in more detail with reference to FIG. 2.

Advantageously, the preservation chamber 101 also comprises at least one distribution device 130 in order to distribute the ingredients picked by the picking device randomly and evenly on a substrate. In the example shown in FIG. 1, three distribution devices 130 are shown, each distribution device having a different diameter from the others in order to adapt to different sizes of substrate and distribute the picked ingredients on said substrates in an optimum manner. Each distribution device 130 is arranged so that the picking and metering device 150 can be moved above each distribution device 130.

Below the distribution devices 130, the motorized secondary conveying device 140 makes it possible to move a substrate 147 towards the inside of the preservation chamber 101, and more particularly below a distribution device 130.

FIG. 2 shows a detailed view of the picking and metering device 150 engaging with a compartment 110 in order to pick ingredients. It comprises the collecting vessel 151 in the form of a flared receptacle and a container 152 situated below the flared receptacle 151. The flared receptacle 151 is oriented so that it presents a wide opening towards the top, and a smaller opening towards the bottom, this smaller opening being connected to the container 152.

The dimensions of the container 152 are such that it can contain all of the ingredients picked in a predetermined quantity from a plurality of compartments. These dimensions are for example suitable for containing all of the ingredients of the culinary preparation that requires the largest volume of ingredients. The ingredients picked successively from the plurality of compartments are thus stored temporarily in the container 152 in successive layers.

A weight sensor 160 makes it possible to control in real time the change in the weight of the ingredients that have fallen into the container 152. It thus makes it possible to control the picking and metering device 150, and more particularly the motor unit 155 that commands the extraction of the ingredients from each compartment 110. For each picking, when the predetermined quantity of ingredients has been reached, by estimating the weight of the container 152, the motor unit 155 switches the extraction element 1552 to a closed configuration.

Preferably, the weight sensor is arranged to detect ingredients falling inside the container 152, and more particularly arranged to detect the weight of each ingredient falling onto the flared receptacle 151. In the picking configuration, the picking and metering device 150 is advantageously arranged so that the flared receptacle 151 is situated in such a position that each ingredient extracted from the compartment falls onto the inner surface of said flared receptacle 151, no ingredient falling directly into the container 152 without touching this inner surface. In this way, it is possible to determine the instantaneous weight of the extracted ingredients from the compartment and accurately control the stopping of said extraction of ingredients when the predetermined quantity of ingredients is reached.

The motor unit 155 comprises a motor 1551, a first pulley 1552, a belt 1553, a second pulley 1554, a linking element 1555 and a connecting part 1556. The motor is arranged to drive the first pulley 1552 in rotation, this rotating movement being transmitted to the second pulley 1554 by the belt 1553. The rotating movement is then transmitted from the second pulley 1554 to the connecting part 1556 via the linking element 1555. The connecting part 1556 is arranged so that it can engage with an extraction element 182 mounted in pivoting connection on the compartment 110. The motor unit 155 and the extraction element 182 thus make it possible to switch said compartment 110 alternately to the picking or storage configurations described above.

The weight sensor can be of any type, for example optical, capacitive or resistive.

Preferably, the weight sensor 160 is of the weighing device type, the collecting vessel 151, 152 being mounted on said weighing device by means of a clamping ring 162, the weighing device 160 being securely fastened by means of a lever 161 to a support plate 163 of the picking and metering device 150.

Preferably, a mechanical damping system is provided to reduce the mechanical vibrations during the use of the picking and metering device 150. An electronic or software system for filtering the signals generated by the measuring sensor can also be used, instead of or as well as the mechanical damping system, to reduce the measurement noise and improve the accuracy of the weight measurement and, ultimately, the picking of the ingredients from each compartment.

On its lower portion, the container 152 comprises a retaining mechanism 168 making it possible to retain the ingredients 157 contained in the container 152 in a closed position, and to empty the container 152 in an open position. Preferably, the opening time of the retaining mechanism 168 is very brief so that all of the ingredients start to fall at the same time, in particular those situated in the peripheral areas of said container 152 and those situated closer to the centre.

In the example shown in FIG. 2, the retaining mechanism 168 comprises two flaps (shown in FIG. 4) connected pivotably to the container 152. The flaps are held in the closed position by an elastic force. They can be switched to the open position by application of a downward force.

Figures 3A, 3B:
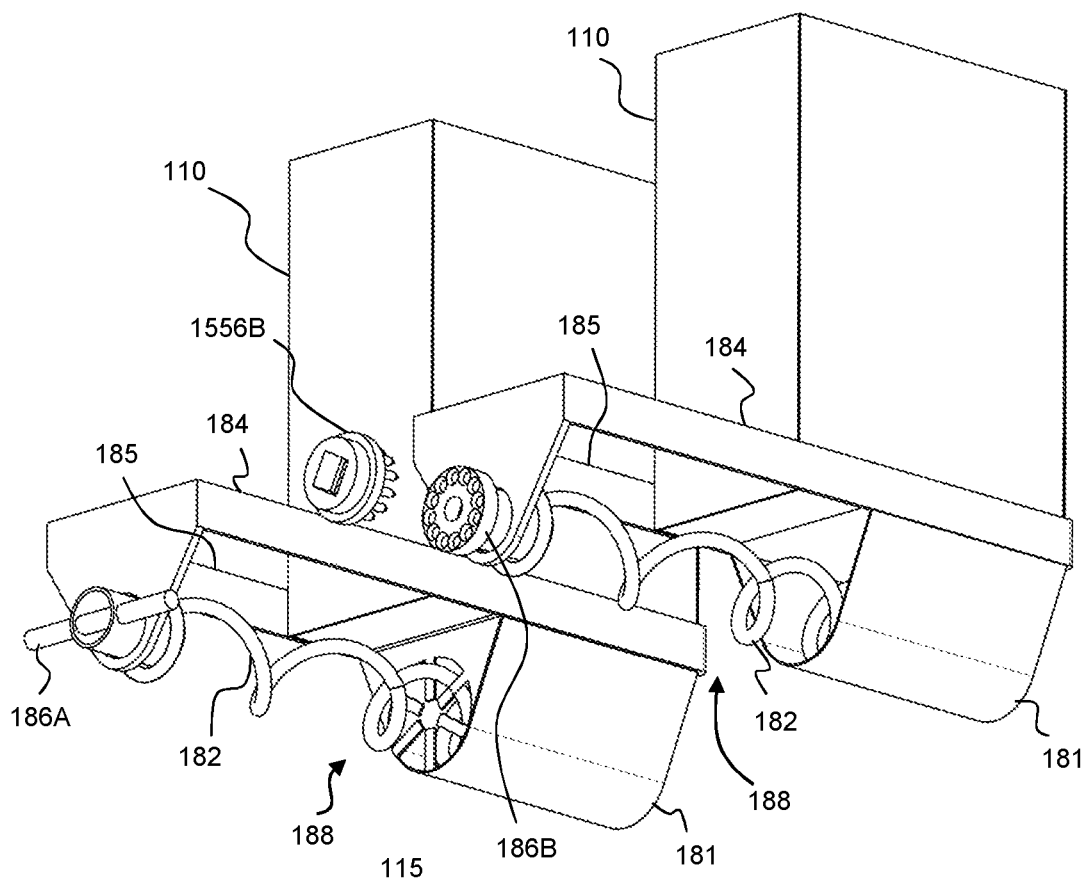
FIGS. 3A and 3B show a detailed view of two compartments and their extraction element.

With reference to FIGS. 2, 3A and 3B, two particular embodiments of compartments will now be described, together with the ingredient extraction element thereof.

The compartment 110 shown is arranged to contain a quantity of ingredients, making it possible to prepare several culinary preparations. In its upper region, it comprises a tank to store said ingredients and in its lower portion, it comprises an extraction element making it possible to extract a predetermined quantity of ingredients in a controlled manner.

In its upper portion, a compartment comprises a parallelepipedal shape making it possible to store a relatively large quantity of ingredients. The upper portion of the compartment 110 can be closed using a removable lid (not shown) in order to allow both the visual inspection of the ingredients that it contains and ease of filling.

Preferentially, the general shape of the compartment 110 is fairly slender towards the top, with a height that is greater than the other two dimensions (width and depth) so that a large portion of the stored ingredients is stacked and a smaller portion of said stored ingredients reaches the lower region under the effect of gravity alone.

In its lower region, the compartment 110 comprises a concave cowl 181 making it possible to retain the stored ingredients, preventing them from falling under the effect of gravity. The cowl 181 at least partially closes the transverse cross-section of the parallelepipedal portion of said compartment 110.

Preferentially, the cowl 181 has a shape that allows the insertion of an extraction element. In the example shown in FIGS. 2 and 3, the extraction element 182 is an auger type mechanism. The auger is held between the rear face of the compartment 110 (not shown) and a front bracket 183 held away from the compartment 110 by means of two lateral arms 184 and 185.

Preferentially, the concave shape of the cowl 181 envelops the helical winding of the auger 182 in order to promote the progress of the ingredients in the direction of the front bracket 183, and more particularly in the direction of the release area 188 formed by the space left free by the cowl 181.

As can be seen in FIG. 2, the picking and metering device 150 is preferably arranged in its picking configuration so that the flared receptacle 151 is situated in line with a release area 188 so that all of the picked ingredients fall into said flared receptacle 151.

In each of the embodiments in FIGS. 3A and 3B, the auger 182 is mounted in free rotation between the rear surface of the compartment 110 and the front bracket 183. It can be actuated by the motor unit 155 which, as mentioned above, can alternatively be mounted on the compartment, for example on the rear surface of said compartment, or on the picking and metering device (as can be seen in FIG. 2).

On the front bracket 183, the auger 182 is rotatably coupled to a connecting element 186A, 186B that makes it possible to engage with the picking and metering device 150, and more particularly with the connecting part 1556. Thus, when the picking and metering device 150 arrives in proximity to the compartment 110, the latter establishes a rotating coupling between the connecting part 1556 and the connecting element 186A, 186B. Thus, the picking and metering device 150 engages with the compartment in order to extract the predetermined quantity of ingredients, by actuating the motor unit 155 situated either on the compartment 110 or on the picking and metering device 150.

In the embodiment in FIG. 3A, the connecting element 186A adopts the form of a rod rotatably secured to the auger 182. A partial closing element 115 is also arranged on an outlet port of the compartment 110. The closing element 115 comprises a set of flexible tabs extending concentrically from the edge of the outlet port. In the embodiment in FIG. 3B, the connecting element 186B adopts the form of a disc equipped with a plurality of openings. The connecting part 1556B of the picking and metering device 150 can then comprise a set of fingers suitable for coupling with the openings of the connecting element 186B.

Optionally, the connecting part 1556 and the connecting element 186B are arranged to establish first a temporary rotating coupling, with friction, in order to act as a clutch, and then an engaged rotating coupling in order to ensure the mechanical link between the motor unit and the extraction element.

Advantageously, the picking and metering device 150 can comprise a motorized translation shaft arranged so that it can move said picking and metering device so as to couple or uncouple the motor unit from the extraction element.

The distribution device according to an aspect of the invention will now be described with reference to FIG. 4, which shows a detailed view of the distribution device placed in an unloading configuration, the collecting vessel being placed above the distribution device.

As can be seen in FIG. 1, the preservation chamber 101 comprises three distribution devices 130, with reference signs 130a, 130b and 130c.

Each distribution device 130 comprises a mixing cylinder 134 suitable for being placed above the substrate 147, the longitudinal axis of the mixing cylinder 134 being substantially perpendicular to the surface of the substrate 147.

The lateral dimensions of each mixing cylinder 134 are adapted to the lateral dimensions of the substrate 147 on which the ingredients 157 must be loaded, so that all of the ingredients passing through the distribution device 130 fall onto the substrate 147. More particularly, the outer diameter of the mixing cylinder 134 is smaller than the smallest outer lateral dimension of the substrate on which the ingredients must be loaded.

In the example shown in FIG. 1, the preservation chamber 101 comprises three distribution devices 130: the outer diameter of the first mixing cylinder 134a is 25 cm, the diameter of the second mixing cylinder 134b is 20 cm, and that of the third mixing cylinder 134c is 14 cm.

Each distribution device 130 is secured to the preservation chamber 101 by means of an upper support 139a and a lower support 139b, that can be seen in FIG. 1. Each distribution device 130 is arranged to allow the picking and metering device 150 to move alternately above each mixing cylinder 134 in a configuration allowing the ingredients contained in the container 152 to fall inside one of the mixing cylinders 134.

More particularly, an opening system 132 positioned in line with each mixing cylinder 134 makes it possible to define a position known as loading position in which the container 152 is preferably aligned concentrically with the mixing cylinder 134 and arranged to trigger the opening of the retaining mechanism 168, and particularly of the flaps 1683a and 1683b. More particularly, the opening system 132 comprises a pressure plate 1321 against which the flaps 1683 can press following an upwards vertical movement of the picking and metering device 150. This pressure results in the opening of the flaps 1683 and therefore the fall of the ingredients 157 contained in the container 152. The closing of the flaps 1683 is actuated by moving the picking and metering device 150 downwards, to a position in which the flaps 1683 are no longer pressing against the pressure plate 1321.

The mixing cylinders 134a and 134b comprise on their respective upper portions a first distribution stage 133a and 133b adopting the shape of a cone the apex of which is substantially aligned with the axis of symmetry of the cylinders 134a and 134b. In the example shown in FIG. 1, the apex of each cone 133 is substantially aligned with the upper edge of the corresponding mixing cylinder 134.

Each mixing cylinder 134 comprises, between its upper end and its lower end, obstacles 136-137 arranged to obstruct the free-fall of the ingredients, so as to generate lateral random movement and distribute them randomly and evenly on the surface of the substrate situated below (not shown).

In the event that a first distribution stage 133 is implemented, the obstacles 136-137 are all situated below said first distribution stage 133, and preferably, they are all situated short of a position along the inner wall of the mixing cylinder 134 corresponding to the intersection between the extension of the conical surface of the first distribution stage with said inner surface of the mixing cylinder 134.

Figure 4:
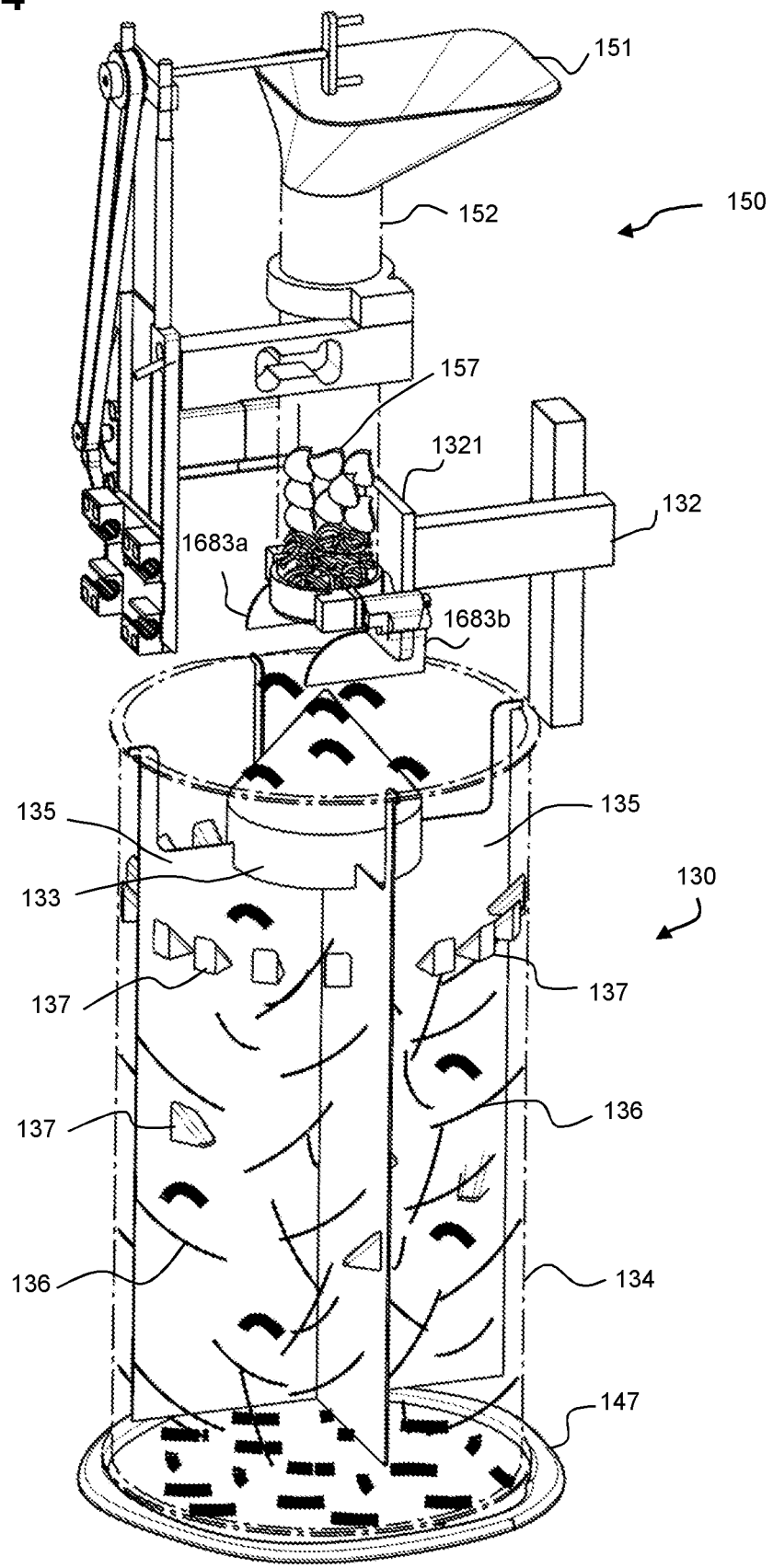
FIG. 4 shows a partial detailed view of the preservation chamber, with the collecting vessel in its unloading position above a distribution device.

In the example shown in FIG. 4, the obstacles 136-137 adopt complementarily the form either of prisms 137 secured by a first side to the inner surface of the mixing cylinder 134 and having a contact surface tilted upwards and towards the inside of said corresponding mixing cylinder 134, or of rods 136 secured by at least one of their ends to the inner surface of the mixing cylinder 134.

Generally, the obstacles 136-137 are positioned, in order to optimize distribution, at different heights along a longitudinal axis of the distribution device 130, said obstacles 136-137 extending in a plurality of directions.

More particularly, the prisms 137 are arranged on the inner peripheral perimeter of the mixing cylinder 134, in a first plane known as rebound plane positioned on the upper portion of the mixing cylinder 134. In the particular case shown in FIG. 4, the first rebound plane is defined by a position corresponding to the intersection between the extension of the conical surface of the first distribution stage 133 with said inner surface of the mixing cylinder 134. This configuration advantageously makes it possible to obtain an excellent lateral distribution on the substrate situated below.

The mixing cylinders 134 can comprise other prisms distributed in order to optimize the distribution of the ingredients below this first rebound plane.

The rods 137 are preferably all oriented downwards in order to prevent certain ingredients falling inside the mixing cylinder 134 from becoming caught on these rods.

The rods 137 can be straight or curved, depending on the desired effect.

In the example shown in FIG. 4, the distribution device 130 also comprises separators 135 that define, in a transverse plane to the longitudinal axis of the mixing cylinder 134, at least two sectors. More particularly, the distribution device 130 comprises four separators 135a distributed at 90° around the central longitudinal axis and dividing said distribution device 130 into four identical sectors.

Alternatively, a distribution device 130 can comprise for example three separators 135 distributed at 1200 around the central longitudinal axis and dividing said distribution device 130b into three identical sectors.

Alternatively, a distribution device 130 can also not comprise such separators.

Some of the obstacles 136-137 are also secured to either side of the separators.

As can be seen in FIG. 7, in a transverse plane to the longitudinal axis of a mixing cylinder 134, the distribution and type of the obstacles 136-137 are arranged so that the distance between two obstacles is slightly greater than the typical dimensions of the ingredients falling inside the mixing device 130.

In fact, if this distance is too great, then the probability of an obstacle falling inside the mixing cylinder 134 rebounding is too low, and the distribution of said ingredients on the surface of the substrate is sub-optimal.

Conversely if, in the transverse plane, the distance between two obstacles is much smaller than the typical dimensions of the ingredients falling inside the mixing cylinder 134, then the probability that the ingredients will remain caught inside said mixing cylinder 134 is too high. In this case also, the loading of the ingredients on the surface of the substrate is sub-optimal.

Advantageously, the distribution device according to the invention can be implemented in the preservation system described in FIG. 1. In this case, the tank from which the ingredients fall through the distribution device can advantageously be the collecting vessel 151, 152 of the picking and metering device 150 of the preservation system 100.

Figure 5:
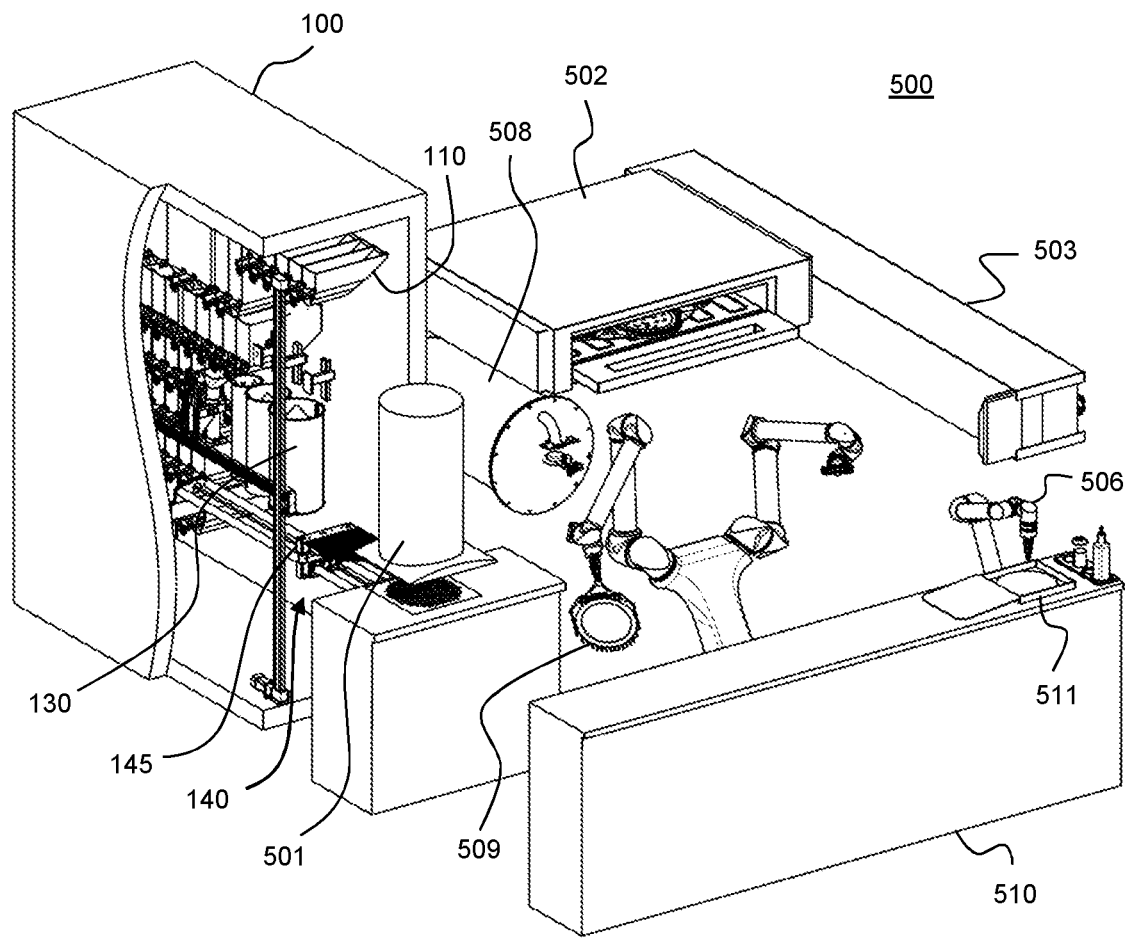
FIG. 5 shows the incorporation of the preservation and metering system according to the invention into an automated machine for preparing culinary preparations.

FIG. 5 shows the use of a preservation and metering system 100 according to any one of the improvements mentioned above in an automated machine for preparing culinary preparations, and more particularly pizzas.

The preservation and metering system 100 can be incorporated into an automated machine 500 carrying out the preparation, cooking and/or packaging and/or delivery of culinary preparations, and particularly of pizzas.

Thus, such an automated machine can comprise:
  a system for preserving and metering ingredients 100 as described with reference to FIG. 1, said ingredients being suitable for being used to prepare said culinary preparations;
  a cooking device 502 for culinary preparations;
  a handling system 504-506 arranged so that it can transfer at least one of the made up culinary preparations between in particular the preservation and metering system 100 and the cooking device 502;
  a processing unit (not shown) programmed to control said automated machine 500 so as to prepare a culinary preparation according to a predetermined recipe.

For ease of understanding, an example will be given for the preparation of a pizza, but the automated machine is arranged to prepare a wide variety of culinary preparations, as mentioned above.

In the example shown in FIG. 5, the automated machine also comprises a tank 508 for fresh dough and a former 501 to sheet the dough used to prepare said pizza; the handling system implemented comprises in particular three multi-axis robotic arms 504-506 and a device 140 for conveyance between a device 501 for forming the fresh dough and the preservation and metering system 100. The robotic arms are arranged to handle the pizza during preparation, for example by means of a (flat) peel 509, and to transfer it from one station to another.

Thus, during a first step, a predetermined quantity of dough, preferably fresh, is extracted from the tank 508 to form a dough piece. This predetermined quantity is sized so that the dough piece can be flattened to the desired dimensions of a pizza.

To this end, the dough piece is transferred to a forming device 501 that gives it the desired form. In this case, the dough piece gives a dough known as sheeted dough, from which the pizza will be made.

Optionally, a sauce (for example tomato, or cream-based) is dispensed and spread in order to prepare the substrate.

Then, the dough prepared in this way is transferred to the inside of the preservation and metering system 100 by a conveying carriage 145. The carriage is moved by the conveying device 140 to a position situated in line with one of the distribution devices 130 so that certain ingredients are loaded on it. These ingredients are picked in predetermined quantities from certain compartments 110 situated in the preservation chamber. Preferentially, said ingredients are loaded randomly and evenly on the surface of the pizza by means of a distribution system 130.

Then, the pizza is transferred to and loaded in the cooking device 502 to be cooked. Depending on the type of pizza loaded, the cooking parameters are determined. These parameters comprise in particular at least one period of time and at least one power cycle. A cooking cycle can comprise several variable or constant cooking regimes.

When a pizza reaches the end of the cooking cycle, the door of the cooking device 502 is opened for the shortest possible time, during which one of the robotic arms, for example the robotic arm 504, grips said pizza.

The robotic arm 504 then places the pizza in a box 511 loaded on a packing station 510. The box 151 is transferred by the robotic arm 502 from a box distribution system 503. The pizza can optionally be sliced and/or seasoned.

Of course, the invention is not limited to the examples which have just been described and numerous adjustments can be made to these examples without exceeding the scope of the invention. In particular, the different characteristics, forms, variants and embodiments of the invention can be combined together in various combinations to the extent that they are not incompatible or mutually exclusive. In particular, all the variants and embodiments described previously can be combined together.

The invention claimed is:

1. A system for preserving and metering ingredients comprising:
  a preservation chamber comprising a set of compartments arranged to store ingredients;
  a picking and metering device for picking and metering the ingredients, arranged so that the picking and metering device can successively pick a predetermined quantity of the ingredients from each of the compartments;
  the picking and metering device for picking and metering the ingredients comprises:
  a collecting vessel arranged to temporarily store, in successive layers, the ingredients picked from each compartment;
  a controlled conveying mechanism comprising one of main rails and side blocks, and a robotic arm, arranged to move the collecting vessel in line with each compartment so that the picked ingredients from each compartment fall into the collecting vessel;
  a control unit having software programmed to control the controlled conveying mechanism and the picking and metering device;
  and
  the picking and metering device comprises:
    an extraction element having an auger type mechanism arranged to engage successively with each compartment in order to extract some of the ingredients contained in the compartment with which the extraction element is engaged;
    a motor unit arranged to actuate the extraction element when the extraction element engages with one of said compartments; and
  said picking and metering device being configured to adopt at least two configurations:
    a configuration known as a coupled configuration, in which the extraction element is coupled to one of the compartments in order to extract some of the ingredients to the collecting vessel;
    a configuration known as an uncoupled configuration, in which the extraction element is uncoupled from each compartment in order to allow the picking and metering device to be able to move to another compartment and/or to an unloading configuration,
  or in the picking and metering device:

each compartment comprises:
  the extraction element arranged to pick some of the ingredients contained in said compartment;
  the motor unit arranged for actuating the extraction element;
the picking and metering device is configured to have at least two configurations:
  a configuration known as a coupled configuration, in which the collecting vessel is placed in line with one of the compartments to collect the extracted ingredients;
  a configuration known as an uncoupled configuration, in which the picking and metering device is movable to another said compartment and/or to the unloading configuration,
or in that:
each compartment comprises the extraction element arranged for picking some of the ingredients contained in said compartment;
the picking and metering device comprises the motor unit arranged for engaging successively with each compartment for actuating the extraction element of the compartment with which the extraction element is engaged;
said picking and metering device being configured to have at least two configurations:
  a configuration known as a coupled configuration, in which the motor unit is coupled to the extraction element of one of the compartments to actuate the extraction element of said compartment and pick some of the ingredients from said compartment to the collecting vessel;
  a configuration known as an uncoupled configuration, in which the motor unit is uncoupled from each extraction element in order to allow the picking and metering device to move to another said compartment and/or to the unloading configuration.

2. The system according to claim 1, characterized in that the controlled conveying mechanism is also arranged for moving the collecting vessel to the unloading configuration, in which the collecting vessel is situated in line with a substrate, the collecting vessel also being arranged to load the picked ingredients on the substrate.

3. The system according to claim 1, characterized in that the auger type mechanism, including an auger, the geometry and speed of rotation of which control the quantity and rate of extraction of the ingredients.

4. The system according to claim 1, characterized in that the picking and metering device also comprises a weight and/or volume device for measuring the weight and/or volume of the ingredients during picking, the control unit being programmed to stop the picking of the ingredients from each compartment when the predetermined quantity of ingredients has been picked.

5. The system according to claim 1, further comprising a distribution device for being situated in an intermediate position between the collecting vessel and a substrate when the collecting vessel is in the unloading configuration, and arranged to allow a random and even distribution of the picked ingredients on said substrate.

6. The system according to claim 5, characterized in that the distribution device comprises a mixing cylinder, a longitudinal axis of the mixing cylinder being perpendicular to a surface of the substrate, the mixing cylinder comprising, between an upper end and a lower end, obstacles arranged to obstruct the free-fall of the ingredients, to generate random lateral movement of the ingredients to distribute the ingredients randomly and evenly on the surface of the substrate.

7. The system according to claim 6, characterized in that the distribution device-also comprises a first distribution stage arranged to disperse the ingredients coming from the collecting vessel radially around the longitudinal axis, said first distribution stage being situated above or in the upper portion of the mixing cylinder.

8. The system according to claim 7, characterized in that the first distribution stage comprises a conical surface that extends laterally inside the mixing cylinder, said first distribution stage being aligned co-axially with the mixing cylinder, and in that at least one said obstacle is secured to said mixing cylinder in a prolongation of said conical surface, so that an ingredient falling the length of the first distribution stage is projected beyond the conical surface onto said at least one said obstacle.

9. The system according to claim 6, characterized in that the mixing cylinder also comprises separators longitudinally dividing said mixing cylinder into several sectors.

10. The system according to claim 9, characterized in that the obstacles are secured to the separators of the mixing cylinder.

11. The system according to claim 6, characterized in that the obstacles have a flat and/or cylindrical contact surface that obstructs the free-fall of the ingredients in the mixing cylinder, said obstacles being secured by at least one end of the obstacles to an inner surface of the mixing cylinder, at different heights along the longitudinal axis and extending in a plurality of directions.

12. A method for metering and placing ingredients on a substrate using a preservation and metering system according to claim 1, characterized in that it comprises, for a predetermined selection of ingredients to be picked:
  for each compartment comprising at least some of the ingredients of said selection:
    moving the collecting vessel towards said compartment;
    coupling the picking and metering device with the compartment so that ingredients can be picked from said compartment;
    picking the predetermined quantity of ingredients contained in said compartment and conveying said ingredients to the collecting vessel;
  when all of the ingredients of said selection have been picked:
    uncoupling the picking and metering device from the compartment;
    moving the collecting vessel into the unloading configuration; and
    opening the collecting vessel in order to dispense the ingredients that it contained onto the substrate placed below the collecting vessel.

13. An automated machine for making culinary preparations comprising:
  a preserving and metering system according to claim 1, said ingredients being used to prepare said culinary preparations;
  a cooker for cooking culinary preparations;
  a handling system arranged to introduce a support for one said culinary preparation into the preservation and metering system and transfer the culinary preparation from the preservation and metering system to the cooker; and a processing unit having software programmed to control said automated machine to prepare a selected culinary preparation of said culinary preparations according to a predetermined recipe.

* * * * *